United States Patent
Wen

(10) Patent No.: US 10,503,541 B2
(45) Date of Patent: Dec. 10, 2019

(54) SYSTEM AND METHOD FOR HANDLING DEPENDENCIES IN DYNAMIC THREAD SPAWNING FOR A MULTI-THREADING PROCESSOR

(71) Applicant: Beijing Panyi Technology Co., Ltd., Beijing (CN)

(72) Inventor: Xingzhi Wen, Fremont, CA (US)

(73) Assignee: Beijing Panyi Technology Co., Ltd., Beijing (CN)

( * ) Notice: Subject to any disclaimer, the term of this patent is extended or adjusted under 35 U.S.C. 154(b) by 0 days.

(21) Appl. No.: 16/209,663

(22) Filed: Dec. 4, 2018

(65) Prior Publication Data

US 2019/0171482 A1 Jun. 6, 2019

Related U.S. Application Data

(60) Provisional application No. 62/594,366, filed on Dec. 4, 2017.

(51) Int. Cl.
*G06F 9/46* (2006.01)
*G06F 9/48* (2006.01)
*G06F 9/30* (2018.01)
*G06F 9/50* (2006.01)

(52) U.S. Cl.
CPC .......... *G06F 9/485* (2013.01); *G06F 9/30101* (2013.01); *G06F 9/5027* (2013.01)

(58) Field of Classification Search
None
See application file for complete search history.

*Primary Examiner* — Gregory A Kessler
(74) *Attorney, Agent, or Firm* — K&L Gates LLP; Jordan A. Kwan

(57) ABSTRACT

Aspects of the present disclosure are presented for a multi-threaded system configured to efficiently handle dynamic thread spawning. When a child thread is spawned when executing a program, it may be possible that the parent thread needs the child thread ID for initialization. However, to get the child thread ID, the child thread may need to be generated, and once it is generated, it could be executed immediately, even before the initialization finishes, causing an error. The present disclosure introduces a memory efficient solution through use of a control circuit configured to control when child threads can be executed while still enabling the parent threads to obtain the child thread IDs.

14 Claims, 4 Drawing Sheets

| Step | Thread 0 | Thread 5 | gr_high | gr_child_id | Thread 100 | Thread 101 |
|---|---|---|---|---|---|---|
| 1 | Start | Start | 99 | 99 | | |
| 2 | Obtain child thread ID 100 | Obtain child thread ID 101 | 99 | 101 | | |
| 3 | Initialize child thread 100 | Initialize child thread 101 | 99 | 101 | | |
| 4 | Continue initializing child thread 100 | Finish initialization and increment gr_high. | 100 | 101 | Problem: Child thread 100 generated, but its initialization has not finished yet. | |

FIG. 4

| | Status of parent threads | | Status of registers in gr_high controller | | | Status of child threads | |
|---|---|---|---|---|---|---|---|
| Step | Thread 0 | Thread 5 | gr_high | gr_child_id | child_id_vec | Thread 100 | Thread 101 |
| 1 | Start | Start | 99 | 99 | 0000 | | |
| 2 | Obtain child thread ID 100 | Obtain child thread ID 101 | 99 | 101 | 0000 | | |
| 3 | Initialize child thread 100 | Initialize child thread 101 | 99 | 101 | 0000 | | |
| 4 | Continue initializing child thread 100 | Finish initialization and send 101 to gr_high controller | 99 | 101 | 0010 | | |
| 5 | Finish initialization and send 100 to gr_high controller | Continue execution of parent thread | 99 | 101 | 0011 | Determine no 0s in between most significant bit with 1 value | |
| 6 | Continue execution of parent thread | | 101 | 101 | 0000 | Start Child Thread 100 | Start Child Thread 101 |

FIG. 5

SYSTEM AND METHOD FOR HANDLING DEPENDENCIES IN DYNAMIC THREAD SPAWNING FOR A MULTI-THREADING PROCESSOR

CROSS REFERENCE TO RELATED APPLICATION

This application claims the benefit of U.S. Provisional Application 62/594,366, filed Dec. 4, 2017, and titled "SYSTEM AND METHOD FOR HANDLING DEPENDENCIES IN DYNAMIC THREAD SPAWNING FOR A MULTI-THREADING PROCESSOR," the disclosure of which is hereby incorporated herein in its entirety and for all purposes.

TECHNICAL FIELD

The subject matter disclosed herein generally relates to multi-threading processing in a parallel processing environment. More specifically, the subject matter relates to methods and systems for handling dependencies in dynamic thread spawning in a multi-threading environment.

BACKGROUND

Parallel processing can be a very powerful architecture in computer processing. To improve scaling, it is important to devise system architectures that are energy and resource efficient, as inefficient flaws can magnify significantly to very large scale systems.

BRIEF SUMMARY

Aspects of the present disclosure are presented for a multi-threading system configured to dynamically spawn child threads from parent threads to operate one or more software programs. In some embodiments, a method for executing child threads of a multi-threading system is presented. The multi-threaded system may include a master thread control unit (MTCU), a plurality of thread control units (TCUs), and a memory storing a low thread parent register, a high thread parent register, and at least one child ID register. The method may include: initializing, by the MTCU, a first parent parallel thread having a first parent ID value between the low thread parent register and the high thread parent register, inclusive; initializing, by the MTCU, a second parent parallel thread having a second ID value between the low thread parent register and the high thread parent register, inclusive, that is different than the first parent ID value; executing, by a first TCU, the first parent parallel thread; executing, by a second TCU, the second parent parallel thread in parallel with the executed first parent parallel thread; generating, by the first TCU, a first child parallel thread having a first child ID value one value higher than the high thread parent register; generating, by the second TCU, a second child parallel thread having a second child ID value one value higher than the first child ID value; storing the first child ID value in the at least one child ID register; storing the second child ID value in the at least one child ID register; initializing, by the first TCU, the first child parallel thread; initializing, by the second TCU, the second child parallel thread; accessing, by the first TCU, the first child ID value using the at least one child ID register, before the first child parallel thread has finished initialization; accessing, by the second TCU, the second child ID value using the at least one child ID register, before the second child parallel thread has finished initialization; incrementing, by the MTCU, the high thread parent register by one after either the first child parallel thread or the second child parallel thread has finished initialization; and executing, by a third TCU, either the first child parallel thread or the second child parallel thread that has finished initialization.

In some embodiments of the method, the multi-threading system further comprises a control circuit, and the method further comprises: transmitting, by the second TCU, an indication to the control circuit that the second child parallel thread has finished initialization; determining, by the control circuit, that the first child parallel thread has not yet finished initialization; and preventing, by the control circuit, both the first child parallel thread and the second child parallel thread from executing until the control circuit receives an indication that the first child parallel thread has also finished initialization.

In some embodiments, the method further comprises: transmitting, by the first TCU, the indication to the control circuit that the first child parallel thread has finished initialization; and in response to the transmitting of the indication that the second child parallel thread has finished initialization and the indication the first child parallel thread has finished initialization, causing, by the control circuit, executing of the first child parallel thread and the second child parallel thread.

In some embodiments, the method further comprises: incrementing, by the control circuit, the high thread parent register by one more, for a total increment of two, after the transmitting of the indication that the second child parallel thread has finished initialization and the indication the first child parallel thread has finished initialization.

In some embodiments of the method, the control circuit comprises a child ID vector comprising a plurality of bits, wherein each of the plurality of bits corresponds to an indication of whether a child parallel thread is initialized.

In some embodiments of the method, a number of uninitialized child parallel threads exceeds in number the plurality of bits of the child ID vector; and the method further comprises: delaying, by a parent parallel thread, transmitting an indication to the control circuit that a child parallel thread has finished initialization until the number of uninitialized child parallel threads is less than or equal to the plurality of bits of the child ID vector.

In some embodiments, the method further comprises updating a bit of the child ID vector to a value of one after the control circuit receives an indication that a child parallel thread has finished initialization.

BRIEF DESCRIPTION OF THE DRAWINGS

Some embodiments are illustrated by way of example and not limitation in the figures of the accompanying drawings.

FIG. 4 presents a table of a process flow for addressing the race condition described in FIG. 2, utilizing a child ID register.

FIG. 5 presents a table of another process flow for addressing multiple race conditions, utilizing a child ID register and a control circuit to manage communications with the parent threads, according aspects of the present disclosure.

DETAILED DESCRIPTION

An XMT (eXplicit Multi-Threading) processor comprises a MTCU (Master Thread Control Unit) and multiple parallel TCUs (Thread Control Unit). The MTCU may execute serial sections of a program and manage parallel and serial mode changes. The MTCU, for example, can be any high performance processor core. A TCU may be a simple light core that is efficient in terms of power and silicon usage. The TCU, for example, can be a 5-stage in-order processor. The XMT processor has two execution modes: (1) serial mode, where only the MTCU is active, and (2) parallel mode, where both the MTCU and parallel TCUs are active. Before switching to the parallel mode, the MTCU specifies how many threads need to be executed in the TCUs by specifying the range of thread IDs in two registers "gr_low" and "gr_high." These registers hold the lower and upper bound of the thread IDs, inclusive. It is typically set by a software program. The TCUs will execute all the IDs that satisfy the following equation:

$$gr\_low \leq thread\ ID \leq gr\_high \qquad \text{Equation (1)}$$

Since the thread IDs are unique, different tasks can be assigned to different threads. Each thread can proceed with different paths depending on the thread ID, so in a single parallel mode, many different types of tasks can be executed in parallel.

The number of parallel TCUs are fixed in a given system and may be more or less than the number of threads that are active. If more threads are active than the number of parallel TCUs, each TCU will get one thread at the beginning starting from gr_low and once the assigned thread finishes, the TCU will be assigned a new thread ID. If the new thread ID is equal to or less than gr_high (valid), the TCU will continue to execute the thread defined by the new ID. If the new thread ID is greater than gr_high (invalid), the thread will simply not be executed by any of the TCUs, as the gr_low and gr_high values are global values that all of the TCUs key off of. A TCU will then flag itself as "idle" and continuously monitor gr_high, since gr_high may be increased by other active threads and the ID may become satisfying Equation (1). If the ID satisfies Equation (1), e.g., the gr_high register is increased, the TCU will execute the ID and get a new ID once it finishes, and this continues until all TCUs become "idle," at which point the XMT processor switches back to serial mode. The execution flow is shown in FIG. 1.

Figure 1:
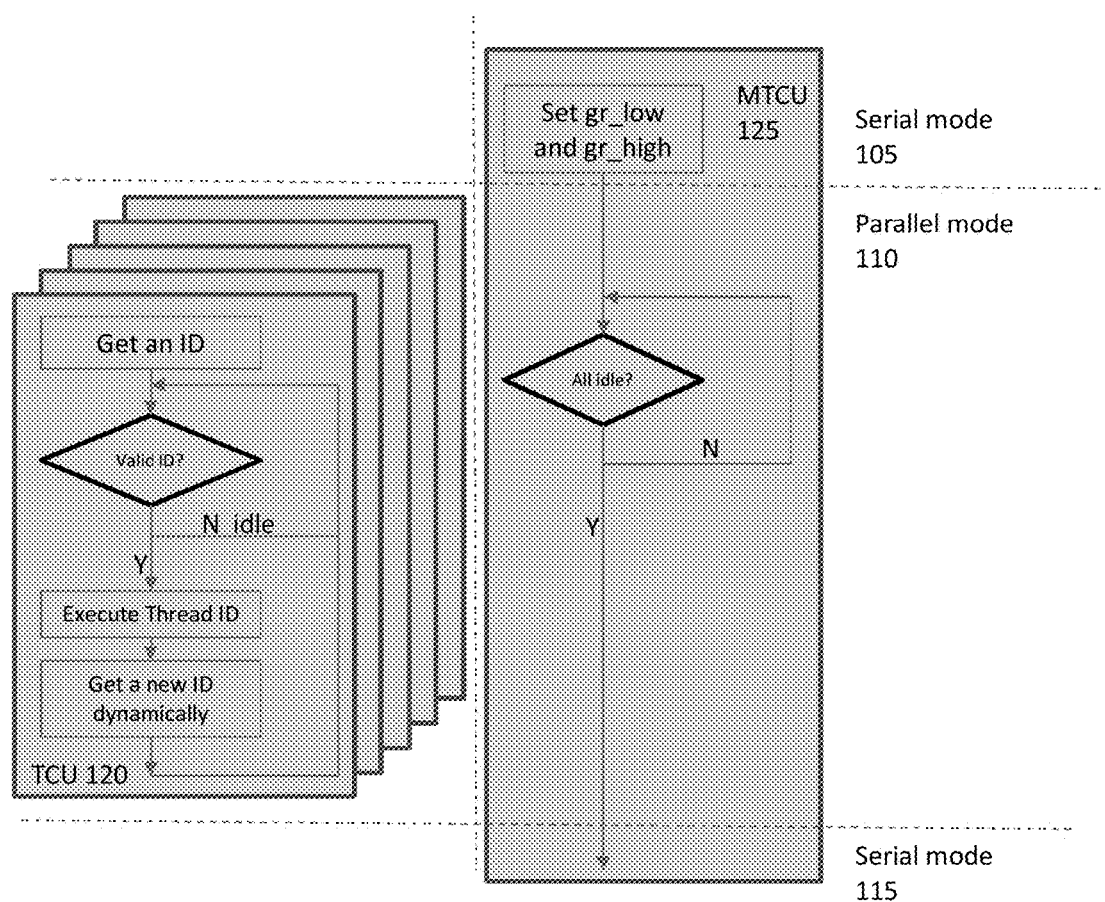
FIG. 1 shows an illustration of the execution flow of a multi-threaded environment, first operating in serial mode, then in parallel mode and then reverting back to serial mode.

As shown in FIG. 1, the execution flow may be viewed as a series of states: first serial mode 105, then parallel mode 110, and then revert back to serial mode 115. Initially in serial mode 105, only the MTCU 125 is active. The MTCU 125 will also set the values of gr_low and gr_high. The MTCU 125 will then specify how many threads need to be run in parallel, and then the XMT will enter parallel mode 110, where multiple TCUs 120 are instantiated to each run one of each thread within the valid thread ID ranges. Parallel mode continues until all threads with valid thread IDs have been executed by TCUs 120. Then the XMT reverts to serial mode 115 where the TCUs 120 stop running.

Figure 2:
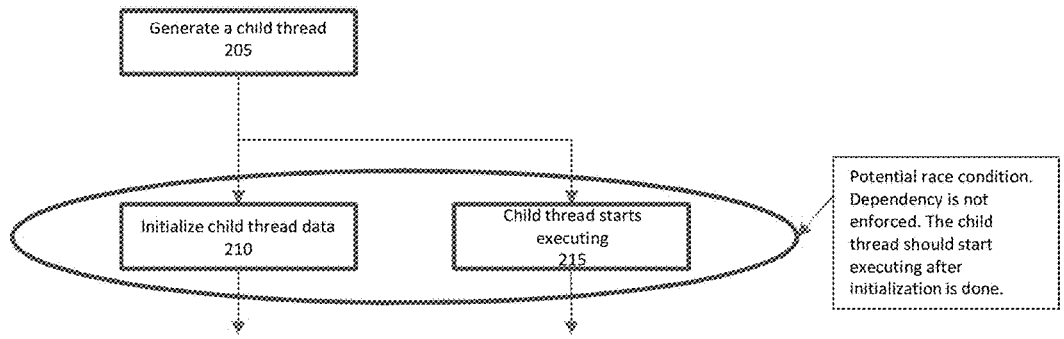
FIG. 2 shows a diagram of a race condition that can occur when a child thread is spawned by a parent thread in a multi-threaded environment.

In parallel mode, if a thread finds that there is work that needs to be done by spawning more threads, it will increase gr_high to activate more threads. The thread that spawns a new thread is referred to as a parent thread, and the thread being spawned is referred to as a child thread. For example, the TCU running a thread of a software program may execute instructions to spawn another thread, in which case the TCU acts as a parent and now needs to spawn a child thread in another TCU. Normally, the parent thread needs to initialize some data for the child thread based on its thread ID. However, in some cases, there could be a potential race condition (shown in FIG. 2) because the parent thread needs the child thread ID for initialization. To get the child thread ID, the child thread will be generated (block 205) and once it is generated, it could be executed immediately (block 215), even before the initialization finishes (block 210).

U.S. Pat. No. 8,209,690 describes a solution to solve this race condition (shown in FIG. 3).

Figure 3:
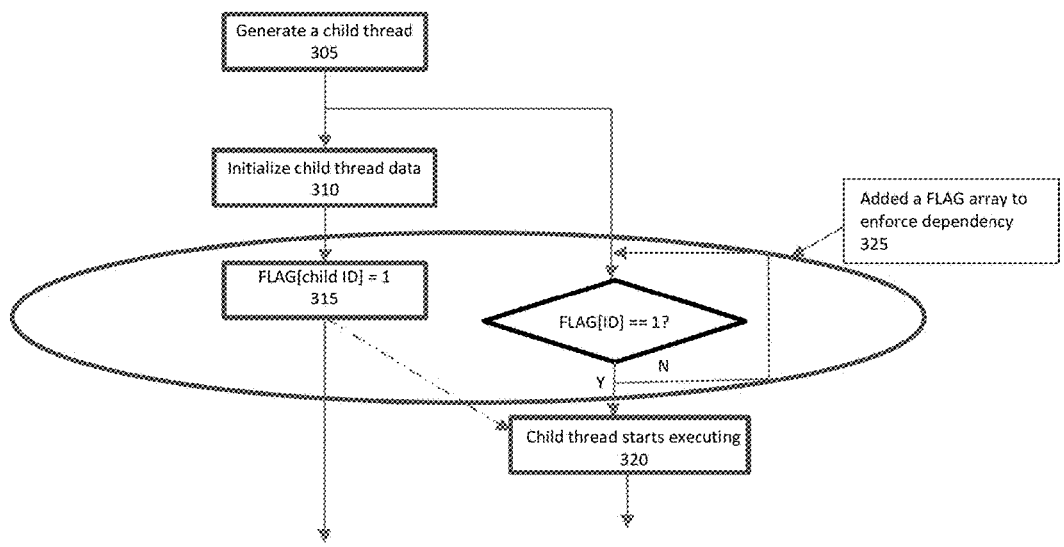
FIG. 3 shows a diagram of one example of how to resolve the race condition described in FIG. 2, using an array for each parent thread.

Here in FIG. 3, the child thread is first generated, at block 305. The child thread data will be initialized at block 310, while at the same time a FLAG array is declared for all possible child thread IDs at block 325. The FLAG array is initialized as 0s in the beginning. The child thread will check the array element corresponding to its own ID, FLAG[ID], and it will do a busy wait until FLAG[ID] becomes 1, which means the parent thread has finished initialization for the child thread. The parent thread gets the ID of the child thread after it creates the child thread and initializes the thread while FLAG[ID] is zero. The parent thread will set FLAG [ID] to one once it finishes the initialization, at block 315, which will allow the child threads to proceed, at block 320. This method however is inefficient, as an additional array for every child thread would need to be created to guard against the possibility of the race condition for every instance that a child thread needs to be generated. Creating the array for each instance utilizes more memory than is necessary if a more efficient solution is provided.

Aspects of the present disclose provide a solution to the problem without using an additional array, FLAG. That is, another register "gr_child_id" may be introduced, which will be initialized to the same value as gr_high by the MTCU. Aspects of the present disclosure introduce a novel methodology for an MTCU to control the activation of the child threads through the combination of registers gr_high, gr_low and gr_child_id. Recall that the race condition problem of needing to execute a child thread from a parent is that the child thread may start executing before the child thread data is initialized.

According to some embodiments herein, if a thread needs to generate a child thread, it will get the child thread's ID from gr_child_id. The child thread IDs will be numbered higher than the value of gr_high. At this point, since gr_high is not incremented, the new child thread is not generated and it will not yet be executed. However, being able to obtain the child thread's ID from gr_child_id, the parent thread is able to initialize any input data for the child thread (in the executed parent portion of the program) with the obtained child thread ID. After the parent thread finishes initialization, gr_high may be updated (incremented higher) to actually generate the child thread. Therefore, the introduction of the third register gr_child_id enables a parent thread to obtain the necessary child thread ID before causing the child thread to be executed, solving the race condition.

A potential issue in this case is that the generated thread ID may not be the same as the child thread ID used in the initialization. An example is shown in the table of FIG. 4. The MTCU starts with a total of 100 threads having thread IDs from 0 to 99. And at a given time, suppose thread 0 and thread 5 need to generate new threads to handle extra work. Suppose for example that thread 0 got 100 for its child thread ID and thread 5 got 101 for its child thread ID. Suppose now that parent thread 5 finishes initialization first and then actually is able to generate its child thread by incrementing gr_high. However, incrementing gr_high simply by makes gr_high=100. This was the ID value for parent thread 0, which may not yet be ready to execute its child thread even though parent thread 5 is. The problem is that parent thread 5 initialized a child thread with an ID equal to 101, but the generated threads ID is 100. This is what may happen if parent threads are programmed to automatically change gr_high on their own when they are ready to execute their child threads. In general, this type of issue may occur because the order in which the parent threads are given child thread IDs may not be the same order in which the parent threads finish initializing their respective child threads, making it so the order in which they are ready to execute their child threads may be different.

To solve this problem, according to some embodiments, a gr_high controller may be introduced, and it will increment gr_high when it is proper. The gr_high_controller may be a control circuit configured to control any changes in the gr_high register. According to some embodiments, the parent threads, each being executed individually by TCUs, will send their child thread ID values to the gr_high controller, and gr_high controller will keep track of all thread IDs received in a vector, child_id_vec. For example, when the current gr_high is 99, bit 0 of child_id_vec represents 100 and bit 1 represents 101, bit 2 represents 102, and so on so forth. To address the aforementioned issue, one solution is that the gr_high controller will only increase gr_high to a new value if all child IDs below that new value and current gr_high are received. Therefore, in the previous example, when the gr_high controller receives 101 from thread 5, it will not increase gr_high yet. After it receives 100 from thread 0 to indicate that parent thread 0 has finished initializing its child thread (with ID 100), since all the thread IDs between 101 and 99 (i.e., 100 and 101) are received (meaning all these threads' initialization are done), gr_high will be updated to 101 by the gr_high_controller, which means child thread 100 and 101 are generated at this point, and both child threads' initializations are done.

The table in FIG. 5 shows this example scenario. Examining the steps and reviewing the status of the parent threads, registers in gr_high_controller and the child threads reflects the scenario previous described. In this example, vector child_id_vec has four bits, with the last bit being bit 0. In other examples vector child_id_vec can have more than four or less than four bits. Each bit may correspond to uninitialized child threads, where a bit=0 means that the child thread is not yet initialized, and the bit=1 means the child thread is initialized. The correspondence of each bit in child_id_vec to which parent thread may depend on the order in which a parent thread was given a child thread ID value. For example, if parent thread 0 obtained child thread ID 100 first, then the least significant bit of child_id_vec corresponds to child ID 100, and if parent thread 5 obtained child thread ID 101 second, then the second least significant bit of child_id_vec corresponds to child ID 101. In general, child_id_vec can be any size sufficient to keep track of the uninitialized child threads.

In these ways, aspects of the present disclosure do not utilize any arrays in order to reliably obtain the child IDs before executing the child threads. By utilizing the additional registers described and implementing the processes between the parent threads, child threads, and the registers as described, no arrays need to be instantiated, saving resources for every single parent thread that might potentially need to create a child thread. For example, if a million parent threads were being executed, old solutions would need to create a million arrays, one for each parent thread, in order to record the FLAG to determine when it was safe to execute the child threads. No such resources would be needed utilizing the solutions presented herein.

In some cases, the parent threads need to make sure the child thread ID being sent to the gr_high controller is less than or equal to the value of (gr_high+number of bits in child_id_vec). In the example above, the parent threads need to make sure the child thread ID being sent to the gr_high controller is less than or equal to 99+4=103. If the child ID is greater than that, the parent thread has to wait until the child threads being tracked in the child_id_vec are all initialized and then executed (e.g., child_id_vec=1111). This will cause all of the four child threads to start executing, the gr_high value will increase by four, the child_id_vec bits will be reset to 0000 and the four bits will now be incremented to correspond to the next four values above gr_high. If parent thread cannot fit its child thread initialization value into the child_id_vec, the information may get lost and the system may result in a dead state. However, in most cases, with a proper number of bits in child_id_vec, waiting should not happen or only happens rarely. Again, this may be mitigated by simply increasing the number of bits in child_id_vec.

While FIG. 5 shows an example solution where two parent threads generate child threads that are managed by the gr_high_controller, in general, aspects of the present disclosure include solutions for an arbitrary number of parent threads that spawn child threads and address the race conditions described herein. For example, generalizing from the example described in FIG. 5, if there were more than two parent threads that are programmed to spawn child threads, each of the child threads may be spawned and the gr_high_controller may assign each of the child threads IDs that start one above the gr_high index and progressively increase by one, e.g., if gr_high is 99, then child ID(1)=100, child ID(2)=101, child ID(3)=102, etc. The gr_high_controller will assign in the child_id_vec the lowest significant bit to be the lowest numbered child thread, with each progressively higher significant bit corresponding to the next higher number child ID, until at most all of the bits of the child_id_vec are indexed to a child thread ID. The parent threads will all now be able to obtain their respective child thread IDs for use in their program sequences. The parent threads will each begin initializing their respective child threads. Any parent threads that need to create a child thread when all of the bits in child_id_vec are currently occupied will submit a request to the gr_high_controller but will not receive an ID yet and will wait until the previous child threads have finished initializing.

Whenever the first of the child threads is finished initializing, that parent thread will send an indication to the gr_high_controller of the event, say by transmitting the child thread ID back. The gr_high_controller will then update that corresponding bit in child_id_vec to indicate that child thread has finished initializing. The gr_high_controller will check to see if the preceding lesser significant bits are all also updated (to 1), so that the gr_high_controller will be able to ensure that the gr_high register can be reliably updated to cause execution of all of the properly initialized child threads. The gr_high_controller will wait to cause incrementing of the gr_high register until all of the preceding lesser significant bits in child_id_vec are updated (to 1), which would indicate that all of the preceding child threads have also finished initializing.

When that condition occurs, the gr_high_controller will then update the gr_high register by the number of consecutive 1s in the child_id_vec, starting from the least significant bit. This will cause all of those child threads to start executing. This process ensures that the initializations of the child threads are all completed before they start being executed. The child_id_vec will then reset those bits with the executed child threads back to zero, and any newly spawned child threads thereafter will be assigned child IDs again higher than the gr_high current value. The process may repeat throughout the operation of the software program.

As shown, aspects of the present disclosure reduce the overhead of spawning a new thread in parallel mode by not using a special array, FLAG. If FLAG is used, at least one memory write operation and one memory read operation per child thread generation is needed. The efficiency of the new solution introduced herein may be more clearly seen when magnifying the problem of creating many more child threads. For example, if one million child threads were needed, using the old array solution, executing the program would require reading 1 million elements, which is very expensive. In the new solution, no memory read is needed.

The parent thread needs to write FLAG[ID] to one and the child thread reads FLAG[ID] at least once, and the child thread may need to clear FLAG[ID] to 0 if FLAG is reused later. All these memory operations are saved according to aspects of the present disclosure with little or no performance penalty, and without the need to declare an array for dynamic spawning.

Figure 6:
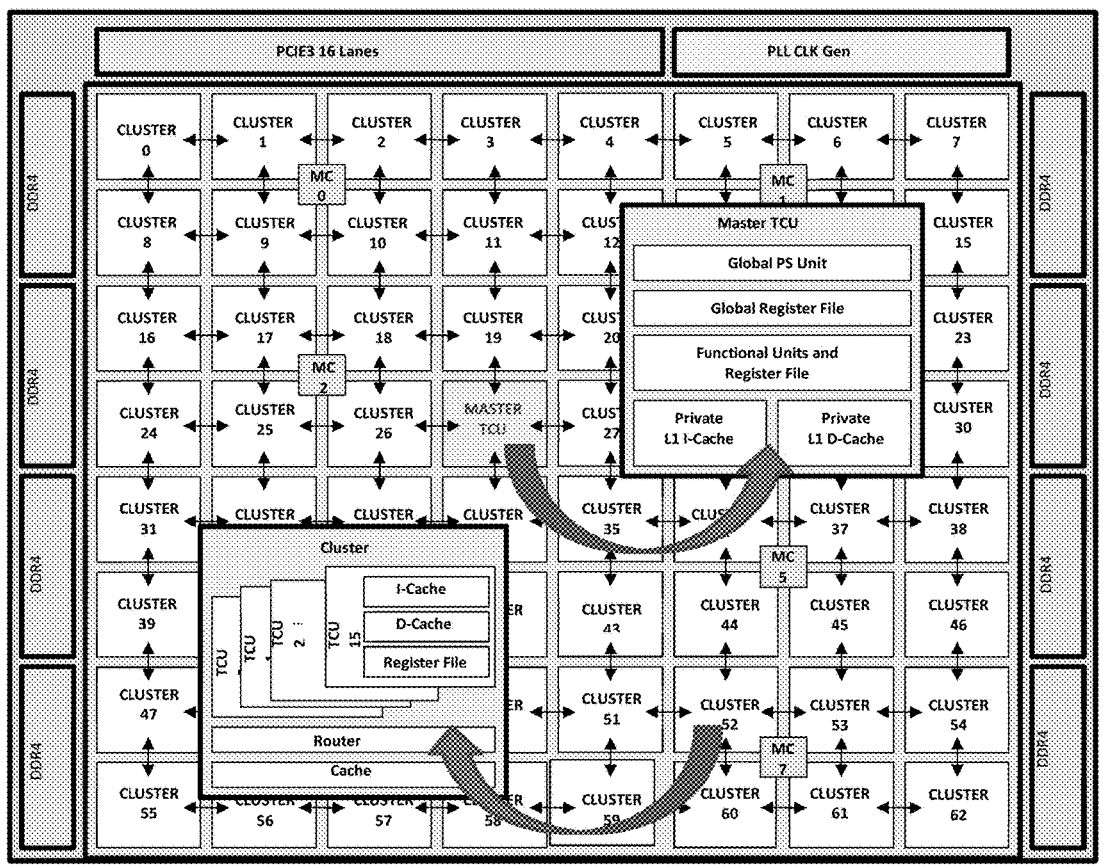
FIG. 6 shows an exemplary architecture of a multithreading processor that may be configured to implement the solutions described herein.

FIG. 6 shows an exemplary architecture of a multithreading processor. The exemplary architecture includes a master thread control unit (MTCU), 64 clusters comprising TCUs and a router and a cache module, eight (8) memory controllers (MC).

As shown in FIG. 6, the master TCU (MTCU) executes the serial portion of the program and handles the special XMT instructions such as spawn and join instruction. The MTCU broadcasts the instructions in a parallel section to all clusters where they are copied to a local instruction buffer and later fetched by TCUs inside clusters. The Master TCU has its own cache, L0, that is only active during serial mode and applies write through. When the XMT processor enters the parallel mode, the Master TCU discards its local cache. The overhead of the flushing L0 cache is trivial since the write through mechanism is chosen. When XMT operates in serial mode, L0 cache is the first level cache of the MTCU and parallel memory modules provide the next level of the memory hierarchy, which is similar to a multilevel cache hierarchy in an advanced uniprocessor.

A cluster is a group of, for example, 16 TCUs and accompanying functional units. The block diagram of a cluster is shown in FIG. 4. A TCU can execute a thread in the parallel mode. TCUs have their own local registers and they are simple in-order pipelines including fetch, decode, execute, memory access and write back stages. The TCUs may have a very simple structure and do not aggressively pursue optimal performance. Given the limited chip area, the overall performance of the XMT is likely better when it has a larger number of simple TCUs than fewer but more advanced TCUs, because of the well known diminishing return of many instruction level parallelism (ILP) techniques. However, the XMT concept does not prevent TCUs from introducing any advanced techniques, since the thread level parallelism (TLP) that XMT is taking advantage of is orthogonal to ILP. Similar to a simultaneous multithreaded (SMT) processor, TCUs share some functional units: Multiplication/Division (M/D) unit and interconnection network port. If several TCUs assigned to a functional unit seek to use it, proper arbitration is used to queue all requests. The cluster has one load/store port to the interconnection network, which is shared by all TCUs inside the cluster. The store counter is used to flush the store operations by counting the number of pending stores.

In an XMT processor, prefix-sum operations are preferably executed very efficiently. The hardware implementation of the prefix-sum unit can accept binary input from multiple TCUs and the execution time does not depend on the number of TCUs that are sending requests to it. PS TCU module in the cluster combines all requests from TCUs and sends one request to the global prefix-sum (PS) unit residing in the MTCU. In some embodiments, the global PS unit includes or is configured to perform the functions of the gr_high_ controller as described herein. It is also responsible for distributing the results from the prefix-sum unit to the individual TCUs.

There are, for example, 64 independent shared cache modules and they are connected to clusters by an interconnection network. The address space is evenly divided among these cache modules. The parallel caches are used primarily for data, since the instructions for regular TCUs are broadcasted by the MTCU and stored in the instruction buffer. The interconnection network is a very important component of the XMT processor and needs to provide high bandwidth low latency communication between clusters and cache modules.

The exemplary multithreading processor of FIG. 6 supports a subset of MIPS I ISA as well as a few XMT specific instructions. The XMT specific instructions include spawn, join, sspawn (for single spawn: generate an additional thread while in parallel mode), ps, psm, and instructions for broadcasting, prefetching, and read-only caches.

Aspects of the present disclosure are not limited to the exemplary multithreading processor of FIG. 6, and can be applied to other parallel computing architectures.

Unless specifically stated otherwise, the terms "a" or "an" are herein used, as is common in patent documents, to include one or more than one instance. Finally, as used herein, the conjunction "or" refers to a non-exclusive "or," unless specifically stated otherwise.

The present disclosure is illustrative and not limiting. Further modifications will be apparent to one skilled in the art in light of this disclosure and are intended to fall within the scope of the appended claims.

What is claimed is:

1. A method for executing child threads of a multithreading system comprising a master thread control unit (MTCU), a plurality of thread control units (TCUs), and a memory storing a low thread parent register, a high thread parent register, and at least one child ID register, the method comprising:

initializing, by the MTCU, a first parent parallel thread having a first parent ID value between the low thread parent register and the high thread parent register, inclusive;

initializing, by the MTCU, a second parent parallel thread having a second ID value between the low thread parent register and the high thread parent register, inclusive, that is different than the first parent ID value;

executing, by a first TCU, the first parent parallel thread;

executing, by a second TCU, the second parent parallel thread in parallel with the executed first parent parallel thread;
generating, by the first TCU, a first child parallel thread having a first child ID value one value higher than the high thread parent register;
generating, by the second TCU, a second child parallel thread having a second child ID value one value higher than the first child ID value;
storing the first child ID value in the at least one child ID register;
storing the second child ID value in the at least one child ID register;
initializing, by the first TCU, the first child parallel thread;
initializing, by the second TCU, the second child parallel thread;
accessing, by the first TCU, the first child ID value using the at least one child ID register, before the first child parallel thread has finished initialization;
accessing, by the second TCU, the second child ID value using the at least one child ID register, before the second child parallel thread has finished initialization;
incrementing, by the MTCU, the high thread parent register by one after either the first child parallel thread or the second child parallel thread has finished initialization; and
executing, by a third TCU, either the first child parallel thread or the second child parallel thread that has finished initialization.

2. The method of claim 1, wherein the multi-threading system further comprises a control circuit, and the method further comprises:
transmitting, by the second TCU, an indication to the control circuit that the second child parallel thread has finished initialization;
determining, by the control circuit, that the first child parallel thread has not yet finished initialization; and
preventing, by the control circuit, both the first child parallel thread and the second child parallel thread from executing until the control circuit receives an indication that the first child parallel thread has also finished initialization.

3. The method of claim 2, further comprising:
transmitting, by the first TCU, the indication to the control circuit that the first child parallel thread has finished initialization; and
in response to the transmitting of the indication that the second child parallel thread has finished initialization and the indication the first child parallel thread has finished initialization, causing, by the control circuit, executing of the first child parallel thread and the second child parallel thread.

4. The method of claim 3, further comprising:
incrementing, by the control circuit, the high thread parent register by one more, for a total increment of two, after the transmitting of the indication that the second child parallel thread has finished initialization and the indication the first child parallel thread has finished initialization.

5. The method of claim 2, wherein the control circuit comprises a child ID vector comprising a plurality of bits, wherein each of the plurality of bits corresponds to an indication of whether a child parallel thread is initialized.

6. The method of claim 5, wherein a number of uninitialized child parallel threads exceeds in number the plurality of bits of the child ID vector; and the method further comprises:

delaying, by a parent parallel thread, transmitting an indication to the control circuit that a child parallel thread has finished initialization until the number of uninitialized child parallel threads is less than or equal to the plurality of bits of the child ID vector.

7. The method of claim 5, further comprising updating a bit of the child ID vector to a value of one after the control circuit receives an indication that a child parallel thread has finished initialization.

8. A multi-threaded system comprising:
a master thread control unit (MTCU),
a plurality of thread control units (TCUs) communicatively coupled to the MTCU; and
a memory communicatively coupled to the MTCU and the plurality of TCUs, and configured to store a low thread parent register, a high thread parent register, and at least one child ID register;
wherein:
the MTCU is configured to:
initialize a first parent parallel thread having a first parent ID value between the low thread parent register and the high thread parent register, inclusive; and
initialize a second parent parallel thread having a second ID value between the low thread parent register and the high thread parent register, inclusive, that is different than the first parent ID value;
a first TCU of the plurality of TCUs is configured to:
execute the first parent parallel thread;
generate a first child parallel thread having a first child ID value one value higher than the high thread parent register;
store the first child ID value in the at least one child ID register;
initialize the first child parallel thread; and
access the first child ID value using the at least one child ID register, before the first child parallel thread has finished initialization;
a second TCU of the plurality of TCUs is configured to:
execute the second parent parallel thread in parallel with the executed first parent parallel thread;
generate a second child parallel thread having a second child ID value one value higher than the first child ID value;
store the second child ID value in the at least one child ID register;
initialize the second child parallel thread; and
access the second child ID value using the at least one child ID register, before the second child parallel thread has finished initialization;
the MTCU is further configured to increment the high thread parent register by one after either the first child parallel thread or the second child parallel thread has finished initialization; and
a third TCU of the plurality of TCUs is configured to execute either the first child parallel thread or the second child parallel thread that has finished initialization.

9. The system of claim 8, further comprising a control circuit, and wherein:
the second TCU is further configured to transmit an indication to the control circuit that the second child parallel thread has finished initialization; and
the control circuit is configured to:
determine that the first child parallel thread has not yet finished initialization; and prevent both the first child parallel thread and the second child parallel thread from executing until the control circuit receives an indication that the first child parallel thread has also finished initialization.

10. The system of claim 2, wherein:
the first TCU is further configured to transmit the indication to the control circuit that the first child parallel thread has finished initialization; and
the control circuit is further configured to execute the first child parallel thread and the second child parallel thread in response to the transmitting of the indication that the second child parallel thread has finished initialization and the indication the first child parallel thread has finished initialization.

11. The system of claim 10, wherein: the control circuit is further configured to increment the high thread parent register by one more, for a total increment of two, after the transmitting of the indication that the second child parallel thread has finished initialization and the indication the first child parallel thread has finished initialization.

12. The system of claim 9, wherein the control circuit comprises a child ID vector comprising a plurality of bits, wherein each of the plurality of bits corresponds to an indication of whether a child parallel thread is initialized.

13. The system of claim 12, wherein a number of uninitialized child parallel threads exceeds in number the plurality of bits of the child ID vector; and
a TCU of the plurality of TCUs is configured to delay transmitting an indication to the control circuit that a child parallel thread has finished initialization until the number of uninitialized child parallel threads is less than or equal to the plurality of bits of the child ID vector.

14. The system of claim 12, wherein the control circuit is further configured to update a bit of the child ID vector to a value of one after the control circuit receives an indication that a child parallel thread has finished initialization.

* * * * *